United States Patent
Xin et al.

(10) Patent No.: US 11,394,947 B2
(45) Date of Patent: Jul. 19, 2022

(54) TEXT DISPLAY METHOD AND APPARATUS IN VIRTUAL REALITY, AND VIRTUAL REALITY DEVICE

(71) Applicant: HUAWEI TECHNOLOGIES CO., LTD., Guangdong (CN)

(72) Inventors: Xin Xin, Shanghai (CN); Weixi Zheng, Shenzhen (CN); Chang Shi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 136 days.

(21) Appl. No.: 16/845,230

(22) Filed: Apr. 10, 2020

(65) Prior Publication Data

US 2020/0244944 A1    Jul. 30, 2020

Related U.S. Application Data

(63) Continuation of application No. PCT/CN2018/110249, filed on Oct. 15, 2018.

(30) Foreign Application Priority Data

Oct. 19, 2017   (CN) .......................... 201710975902.0

(51) Int. Cl.
*H04N 13/106* (2018.01)
*H04N 13/183* (2018.01)
(Continued)

(52) U.S. Cl.
CPC ....... *H04N 13/183* (2018.05); *G02B 27/0093* (2013.01); *G02B 27/0172* (2013.01);
(Continued)

(58) Field of Classification Search
CPC ...... G02B 2027/0138; G02B 2027/014; G02B 27/0093; G02B 27/0172; G06F 3/01;
(Continued)

(56) References Cited

U.S. PATENT DOCUMENTS

| | | | |
|---|---|---|---|
| 2008/0074444 A1 | 3/2008 | Morikawa et al. | |
| 2008/0079753 A1* | 4/2008 | Victor | G02B 27/017 345/472 |

(Continued)

FOREIGN PATENT DOCUMENTS

| | | |
|---|---|---|
| CN | 103076957 A | 5/2013 |
| CN | 103165064 A | 6/2013 |

(Continued)

OTHER PUBLICATIONS

Extended (Supplementary) European Search Report dated Aug. 4, 2020, issued in counterpart EP Application No. 18869124.0 (7 pages).

(Continued)

*Primary Examiner* — Ram A Mistry
(74) *Attorney, Agent, or Firm* — Westerman, Hattori, Daniels & Adrian, LLP

(57) ABSTRACT

This application provides a text display method and apparatus in virtual reality, and a virtual reality device. The method includes: receiving text information; determining a font size of the text information based on a pixel per degree $PPD_{VR\ device}$ of a virtual reality VR device, a pixel per degree $PPD_{Human\ eye}$ of an eye of a user, distance information between the text information in VR and the eye of the user, and a correction value α; rendering the text information based on the font size of the text information; and displaying the rendered text information.

12 Claims, 9 Drawing Sheets

(51) Int. Cl.
*G06F 40/109* (2020.01)
*G02B 27/00* (2006.01)
*G02B 27/01* (2006.01)

(52) U.S. Cl.
CPC ...... *G06F 40/109* (2020.01); *G02B 2027/014* (2013.01); *G02B 2027/0138* (2013.01)

(58) Field of Classification Search
CPC ........ G06F 3/011; G06F 40/10; G06F 40/109; G06T 15/00; G06T 19/00; H04N 13/183
See application file for complete search history.

(56) References Cited

U.S. PATENT DOCUMENTS

| | | | |
|---|---|---|---|
| 2010/0118055 A1 | 5/2010 | Nishibori | |
| 2012/0287163 A1* | 11/2012 | Djavaherian | G06F 3/012 |
| | | | 345/667 |
| 2013/0044290 A1* | 2/2013 | Kawamura | A61B 3/032 |
| | | | 351/201 |
| 2013/0176345 A1* | 7/2013 | Kim | G06F 3/048 |
| | | | 345/666 |
| 2015/0254905 A1* | 9/2015 | Ramsby | G06T 3/40 |
| | | | 345/419 |
| 2016/0328884 A1 | 11/2016 | Schowengerdt et al. | |
| 2017/0061936 A1* | 3/2017 | Matsuyama | G09G 5/377 |

FOREIGN PATENT DOCUMENTS

| | | |
|---|---|---|
| CN | 103197833 A | 7/2013 |
| CN | 105653032 A | 6/2016 |
| CN | 105916022 A | 8/2016 |
| CN | 105975169 A | 9/2016 |
| CN | 106200956 A | 12/2016 |
| CN | 106445277 A | 2/2017 |
| CN | 107247511 A | 10/2017 |

OTHER PUBLICATIONS

Office Action dated Dec. 4, 2019, issued in counterpart CN application No. 201710975902.0, with English translation. (11 pages).
International Search Report dated Jan. 3, 2019, issued in counterpart application No. PCT/CN2018/110249. (11 pages).

* cited by examiner

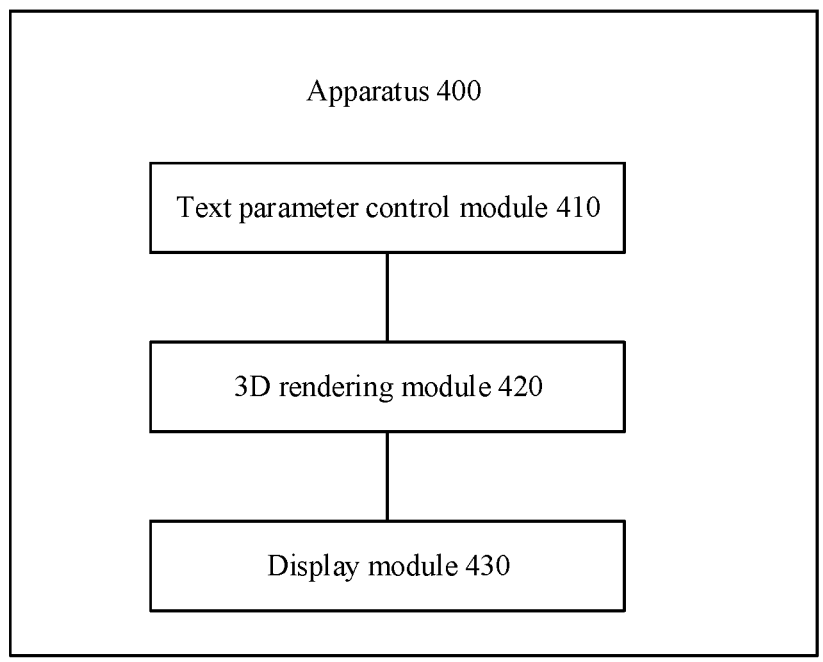

TEXT DISPLAY METHOD AND APPARATUS IN VIRTUAL REALITY, AND VIRTUAL REALITY DEVICE

CROSS-REFERENCE TO RELATED APPLICATIONS

This application is a continuation of International Application No. PCT/CN2018/110249, filed on Oct. 15, 2018, which claims priority to Chinese Patent Application No. 201710975902.0, filed on Oct. 19, 2017. The disclosures of the aforementioned applications are hereby incorporated by reference in their entireties.

TECHNICAL FIELD

This application relates to the field of virtual reality display, and more specifically, to a text display method and apparatus in virtual reality, and a virtual reality device.

BACKGROUND

Virtual reality (VR) creates, through computer simulation, a virtual world in three-dimensional space, and provides a user with simulation of senses such as vision, an auditory sensation, and a tactile sensation, so that the user can observe things in the three-dimensional space in a timely manner and without limitations is if the user has an immersed sense. Display devices of VR hardware include a VR head mounted display device, a binocular omnidirectional display, and the like. Users obtain virtual reality effects on vision by wearing VR display devices. For example, the VR display devices may include VR glasses, VR helmets, and the like.

Currently, limited by VR hardware performance, the most common problems in a current VR experience process are that the users' eyes are tired and texts or images in a VR scene may not be viewed clearly. In particular, when the users view text information in the VR experience process, smaller texts are displayed less clearly, greatly degrading user experience. How to quickly find a smallest comfortable readable font and improve user experience becomes a problem needing to be urgently resolved in the industry.

SUMMARY

This application provides a text display method and apparatus in virtual reality, and a virtual reality device that can resolve a problem of unclear text display in a current virtual reality environment. The text display method, text display apparatus, and virtual reality device can be directly applied to various virtual reality platforms; and can also resolve a problem that in virtual environments, a developer cannot quickly obtain various comfortable and readable font heights in different VR devices and at different distances in the virtual environments. Accordingly, user experience is improved, and development costs are reduced.

According to a first aspect, a text display method in virtual reality is provided. The method includes: receiving text information; determining a font size of the text information based on a pixel per degree of a virtual reality VR device, a pixel per degree of an eye of a user, distance information between the text information in VR and the eye of the user, and a correction value α; rendering the text information based on the font size of the text information; and displaying the rendered text information.

According to the text display method in virtual reality according to the first aspect, clear and readable font sizes corresponding to different VR devices and different distances may be determined based on the pixel per degree $PPD_{Human\ eye}$ of the eye of the user, the pixel per degree $PPD_{VR\ device}$ of the VR device, a distance between text information in virtual space and the eye of the user, and the correction value α. For designers and developers of display texts in VR systems, individual differences caused by determining a font effect by using existing visual observation manners can be prevented. Therefore, fonts that are designed and developed by using the method in this embodiment of this application for the display texts in the VR systems are universal, and for most users, the font effect is clear. In addition, for VR devices of different specifications, when same content is migrated between VR devices with different pixels per degree, because the text display method in virtual reality according to the first aspect is related to the pixel per degree of the VR device, the font size can be adjusted with the different pixels per degree, that is, can adapt to the VR devices of different specifications, to prevent a case in which there are differences between text effects of the text information in a process of migrating the text information between the VR devices of different specifications, thereby improving user experience and reducing difficulty and costs of migrating the text information between the VR devices of different specifications.

In a possible implementation of the first aspect, before the determining of a font size of the text information based on a pixel per degree of a virtual reality VR device, a pixel per degree of an eye of a user, distance information between the text information in VR and the eye of the user, and a correction value α, the method further includes: obtaining the distance information between the text information in the VR and the eye of the user.

In a possible implementation of the first aspect, the text information includes the distance information between the text information in the VR and the eye of the user.

In a possible implementation of the first aspect, a relationship between the font size of the text information and the pixel per degree of the VR device, the pixel per degree of the eye of the user, the distance information between the text information in the VR and the eye of the user, and the correction value α is:

$$H_{VR} = \tan\left(\alpha \frac{PPD_{Human\ eye}}{PPD_{VR\ device}}\right) \cdot d$$

where $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, and α is the correction value.

In a possible implementation of the first aspect, the determining of a font size of the text information based on a pixel per degree of a virtual reality VR device, a pixel per degree of an eye of a user, distance information between the text information in VR and the eye of the user, and a correction value a includes: determining the font size of the text information based on the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value α.

In a possible implementation of the first aspect, the pixel per degree $PPD_{Human\ eye}$ of the eye of the user is 60 pixels per degree.

In a possible implementation of the first aspect, the correction value α is a high corresponding visual angle formed by a text height and the eye of the user, and a value range of α is greater than or equal to 1 degrees and less than or equal to 22 degrees.

According to a second aspect, a text display apparatus in virtual reality is provided. The apparatus includes a text parameter control module, a 3D rendering module, and a display module. The text parameter control module is configured to receive text information; the text parameter control module is further configured to determine a font size of the text information based on a pixel per degree of a virtual reality VR device, a pixel per degree of an eye of a user, distance information between the text information in VR and the eye of the user, and a correction value α; the 3D rendering module is configured to render the text information based on the font size of the text information; and the display module is configured to display the rendered text information.

The text display apparatus in virtual reality according to the second aspect may determine, based on the pixel per degree $PPD_{Human\ eye}$ of the eye of the user, the pixel per degree $PPD_{VR\ device}$ of the VR device, a distance between text information in virtual space and the eye of the user, and the correction value α, clear and readable font sizes corresponding to different VR devices and different distances. For designers and developers of display texts in VR systems, individual differences caused by determining a font effect by using existing visual observation manners can be prevented. Therefore, fonts that are designed and developed by using the apparatus in this embodiment of this application for the display texts in the VR systems are universal, and for most users, the font effect is clear. In addition, for VR devices of different specifications, when same content is migrated between VR devices with different pixels per degree, because the text display apparatus in virtual reality according to the second aspect is related to the pixel per degree of the VR device, a case in which there are differences between text effects of the text information in a process of migrating the text information between the VR devices of different specifications is prevented, thereby improving user experience and reducing difficulty and costs of migrating the text information between the VR devices of different specifications.

In a possible implementation of the second aspect, before determining the font size of the text information, the text parameter control module is further configured to obtain the distance information between the text information in the VR and the eye of the user.

In a possible implementation of the second aspect, the text information includes the distance information between the text information in the VR and the eye of the user.

In a possible implementation of the second aspect, a relationship between the font size of the text information and the pixel per degree of the VR device, the pixel per degree of the eye of the user, the distance information between the text information in the VR and the eye of the user, and the correction value α is:

$$H_{VR} = \tan\left(\alpha \frac{PPD_{Human\ eye}}{PPD_{VR\ device}}\right) \cdot d$$

where $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, and α is the correction value.

In a possible implementation of the second aspect, the text parameter control module is specifically configured to determine the font size of the text information based on the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value α.

In a possible implementation of the second aspect, the pixel per degree $PPD_{Human\ eye}$ of the eye of the user is 60 pixels per degree.

In a possible implementation of the second aspect, the correction value α is a high corresponding visual angle formed by a text height and the eye of the user, and a value range of α is greater than or equal to 18 degrees and less than or equal to 22 degrees.

According to a third aspect, a text display apparatus in virtual reality is provided. The apparatus includes a processor and a memory that are configured to support the apparatus in implementing corresponding functions in the foregoing method. The memory is configured to store a program and the processor is configured to invoke the program to implement the text display method in virtual reality according to the first aspect and the implementations of the first aspect.

According to a fourth aspect, a VR device is provided. The VR device includes the text display apparatus in virtual reality according to any one of the second aspect or the third aspect and the possible implementations of the second aspect or the third aspect.

The VR device according to the fourth aspect may perform the text display method in virtual reality according to the first aspect. That is, the clear and readable font sizes corresponding to the different VR devices and the different distances are determined based on the pixel per degree $PPD_{Human\ eye}$ of the eye of the user, the pixel per degree $PPD_{VR\ device}$ of the VR device, the distance between the text information in the virtual space and the eye of the user, and the correction value α. For most users, when the VR device with the font is used, an effect of a viewed font or image is clear, thereby improving user VR experience.

According to a fifth aspect, a computer-readable storage medium is provided. The computer-readable storage medium is configured to store a computer program, where the computer program includes an instruction used to perform the method according to any one of the first aspect or the possible implementations of the first aspect.

According to a sixth aspect, a system chip is provided. The system chip includes a processing unit and a communications unit, where the processing unit may be, for example, a processor, and the communications unit may be an input/output interface, a pin, a circuit, or the like. The processing unit may execute a computer instruction, so that a chip in the terminal performs the text display method in virtual reality according to the first aspect.

BRIEF DESCRIPTION OF DRAWINGS

FIG. 10 is a schematic diagram of a font height displayed in a VR device according to an embodiment of this application;

FIG. 11 is a schematic block diagram of a text display apparatus in virtual reality according to an embodiment of this application.

DESCRIPTION OF EMBODIMENTS

Figure 1:
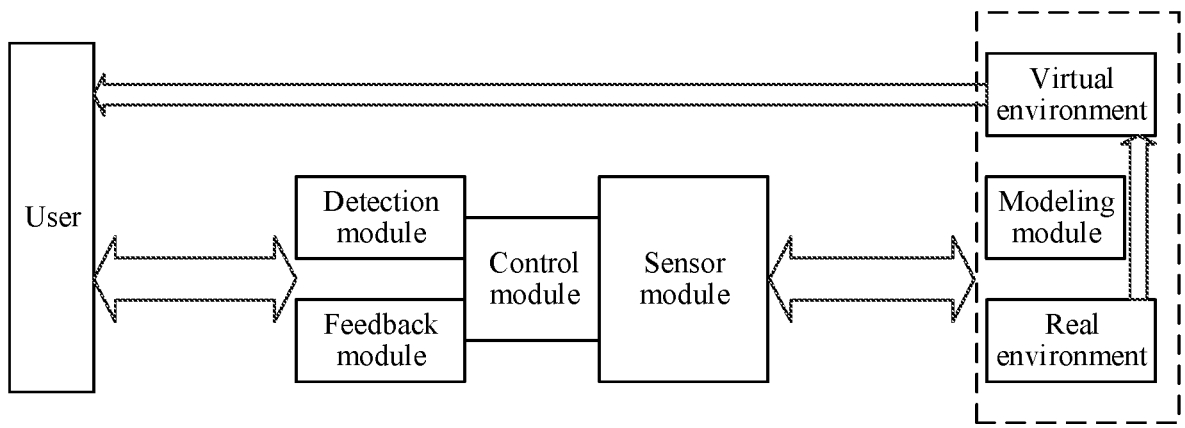
FIG. 1 is a schematic diagram of basic components of a virtual reality system.

The following describes technical solutions of this application with reference to accompanying drawings.

Embodiments of this application relate to following critical terms.

Retinal resolution: Retinal resolution is also referred to as a pixel per degree of a human eye. A pixel per degree (PDD) is a quantity of pixels that can be arranged per inch. A larger quantity of pixels per degree indicates that a display screen can display an image at a higher density. For head mounted displays, to achieve "retinal resolution" is an ultimate goal. At a particular pixel density, even people with perfect visual acuity cannot distinguish any extra details. For visual quality, any screen with more than 60 pixels per degree actually causes a waste, because human eyes cannot distinguish any extra details. This is referred to as a limit of retinal resolution of human eyes.

A pixel per degree of a head mounted display screen refers to pixels included in each degree on a screen of a head mounted display device. A pixel per degree of a screen of an existing VR head mounted display device is 10 to 20 pixels per degree.

A three-dimensional (3D) engine is a set that abstracts materials in reality into forms of expression such as polygons or various curves, and performs related computing in a computer and outputs algorithm implementation of final images. Usually, the 3D engine, as an underlying tool, supports graphics software development of higher layers, and the 3D engine is like building a "real world" inside the computer.

A three-dimensional model refers to a polygon representation of objects, and is usually displayed by using a computer or other video devices. Displayed objects may be entities in real world, or may be fictional objects. The three-dimensional model is often generated by using dedicated software such as a three-dimensional modeling tool, but the three-dimensional model may also be generated by using other methods. As data of points and other information sets, the three-dimensional model may be manually generated or may be generated based on a particular algorithm.

Material mapping is also referred to as texture mapping. In computer graphics, material mapping is to wrap bitmaps stored in a main memory around a surface of a 3D rendering object. Texture mapping provides abundant details for an object, and simulates a complex appearance in a simple manner. An image (texture) is pasted onto (mapped) a simple shape in a scene, like pasting a printing onto a plane.

Oculus (oculus) is a VR company that is acquired by Facebook (Facebook), owns VR content platforms and VR helmets, and is a current representative VR company in the industry. A resolution of the helmet is 2160*1080, a field of view is 90 degrees, and the helmet is connected to a computer.

Google Daydream is a platform consolidating Android (Android) smartphones and a new generation of virtual reality head mounted devices. In addition to Daydream video (View) head mounted devices of Google, smartphone manufacturers can also develop and design head mounted devices, as long as the head mounted devices meet standards of Google.

Virtual reality creates, through computer simulation, a virtual world in three-dimensional space, and provides a user with simulation of senses such as vision, an auditory sensation, and a tactile sensation, so that the user can observe things in the three-dimensional space in a timely manner and without limitations as if the user has an immersed sense. FIG. 1 is a schematic diagram of basic components of a virtual reality system. As shown in FIG. 1, the basic components of the virtual reality system include an observer, a sensor module, an effect generator (including a detection module, a feedback module, and a control module) and a real view emulator (including a virtual environment, a modeling module, and a display environment). On a user side, there is mainly a VR display system that is usually a head mounted VR display system, for example, a head mounted display (HMD).

The virtual reality systems may be classified, based on different functions thereof into four types including an immersive virtual reality system, an augmented reality virtual reality system, a desktop virtual reality system, and a distributed virtual reality system. The immersive virtual reality system provides a user with completely immersive experience, so that the user has a feeling of being in a virtual world. An obvious feature of the immersive virtual reality system is that, vision and an auditory sensation of a user are closed by using a head mounted display, to create virtual vision. In addition, a data glove is used in the immersive virtual reality system to close a hand feel channel of the user, to create a virtual tactile sensation. The system enables, by using a voice recognizer, the user to deliver an operation command to a system host, and meanwhile, a head tracker, a hand tracker, and an eyes vision direction tracker track a head, a hand, and an eye, so that the system achieves real-time performance as much as possible. A common immersive system is a system based on the head mounted display, and forms stereopsis by using a binocular parallax between a left eye and a right eye.

For a virtual reality system, for example, an immersive virtual reality system, a VR display system (device) an a user side generally includes a modeling module. The modeling module is configured to build three-dimensional objects required in a virtual environmental world, for example, texts, cards, object models, and three-dimensional environments. A graphical user interface (GUI) in the modeling module displays all buttons, menus, texts, cards, and the like. The GUI is also responsible for providing a reliable logical module tor functions and interaction of the elements. For example, the logical module includes a text parameter control module and a 3D rendering module. The text parameter control module is mainly configured to control a size of displayed texts, for example, a text height and a text width. The 3D rendering module mainly manages an entire 3D engine, where a main camera of a VR scene determines an object to be rendered and details of encapsulated rendering of the 3D engine, sends the object and the details to the 3D rendering module through a rendering pipeline, and can further provide access through pixels and a vertex shader. The modeling module may further include other functional modules or units, for example, an input (input) module and an artificial intelligence module. This is not limited in this embodiment of this application herein.

Figure 2:
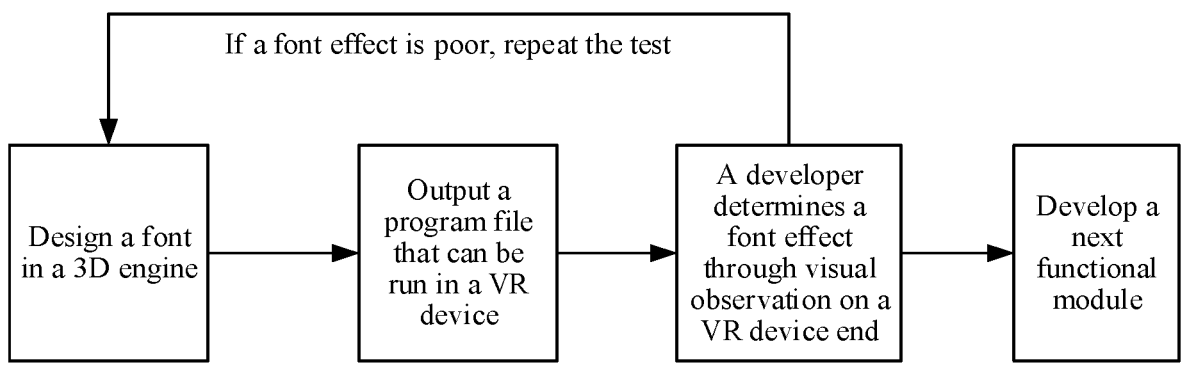
FIG. 2 is a schematic flowchart of designing and developing display texts in a VR system in the related art.

FIG. 2 is a schematic flowchart of designing and developing display texts in a VR system in the related art. As shown in FIG. 2, in current design and development of display texts in a VR system, a common practice in the industry is to set font parameters (a font size, a color, transparency, and the like) in a 3D engine of a modeling module, and then output a program file that can be run in a VR device (for example, a glasses terminal). A developer determines a font effect through visual observation with the glasses terminal, and if it is determined that the font effect can be viewed clearly, then a next functional module is developed; otherwise continues to repeat the test.

In the related art, because of a lack of a correct standard, the developer needs to spend a lot of time in text testing. In addition, compared with graphic design of a conventional terminal, there is one more piece of dimensional information in a 3D environment, and the user has different requirements for a text height at different distances. Therefore, the developer needs to test texts at different distances in a virtual environment, leading to a high workload. In addition to the high workload, because of differences between individual developers, such as myopia, astigmatism, hyperopia, and other problems, test results are different. Consequently, it cannot be ensured that a text height after a final test is universal. User experience is relatively poor, and a testing process is relatively complex.

On the other hand, pixels per degree (PPD) of screens of different VR terminal devices are also inconsistent, for example, a pixel per degree of a screen of an Oculus terminal device is 12, and a pixel per degree of a screen of a Google Daydream terminal device is 14. The developer experiments on a VR terminal device of one specification, and when information such as font setting parameters with a better effect in the VR device of the specification is used in a VR device of another specification, because pixels per degree of screens of different devices are different, display effects of same content on devices having screens with different pixel per degrees are different. For example, a same font specification that is set by using a same font setting parameter is just clear on the Google Daydream terminal device, but is unclear on the Oculus terminal device. This case results in the fact that the developer needs to reset a new text height based on the VR device when migrating the same content from a Daydream platform to an Oculus platform, and needs to re-test and re-verify the text height in a development process, greatly increasing difficulty and costs of content migration.

Based on the foregoing problems, an embodiment of this application provides a text display method in virtual reality that can resolve a problem of unclear text display in a current virtual reality environment. The text display method can be directly applied to various virtual reality platforms, and can also resolve the problem that in virtual environments, a developer cannot quickly obtain various comfortable and readable font heights in different VR devices and at different distances in the virtual environments. Accordingly, user experience is improved and development costs are reduced.

Figure 3:
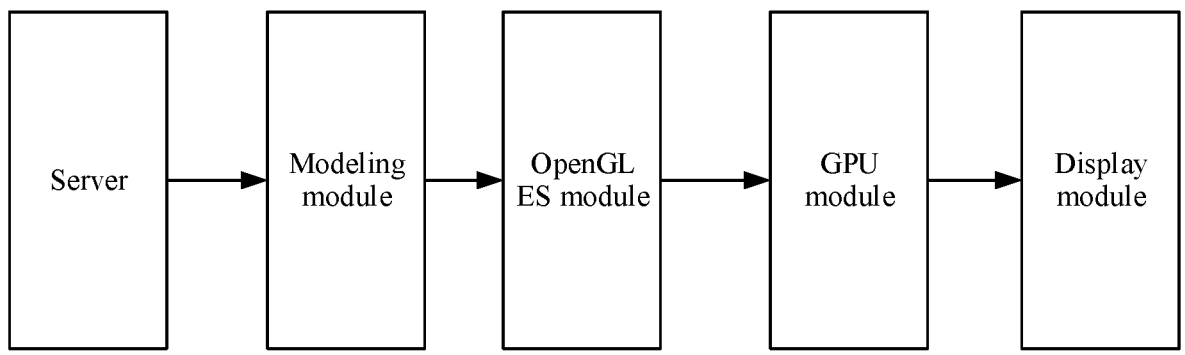
FIG. 3 is a schematic diagram of a typical system architecture to which an embodiment of this application is applied.

FIG. 3 is a schematic diagram of a typical system architecture to which an embodiment of this application is applied. As shown in FIG. 3, the system includes a server, a modeling module, an open graphics library embedded system (OpenGL ES) module, a graphics processing unit (CPU) module, and a display module. The modeling module, the OpenGL ES module, the GPU module, and the display module, belong to a virtual reality system on a user side, and are disposed in a VR device. The server is configured to send text information to the modeling module in the virtual reality system on the user side, and the modeling module is configured to model the text information according to the text display method in virtual reality provided in the embodiments of this application, that is, configured to build three-dimensional objects required in a virtual environmental world, including, for example, texts, cards, object models, and three-dimensional environments. The modeling module may include a text parameter control module, a 3D rendering module, and the like. The OpenGL ES module is configured compile data output from the modeling module, convert the data into application programming interface (API) data that can be recognized by the GPU module, and send the data to the GPU module. The GPU module is configured to perform image rendering, text rendering and the like based on the received data. The display module is configured to display an image rendered by the GPU module to a user.

It should be understood that, merely the system architecture shown in FIG. 3 is used as an example for description in this embodiment of this application, but this embodiment of this application is not limited thereto, for example, the system may include other modules and the like.

Figure 4:
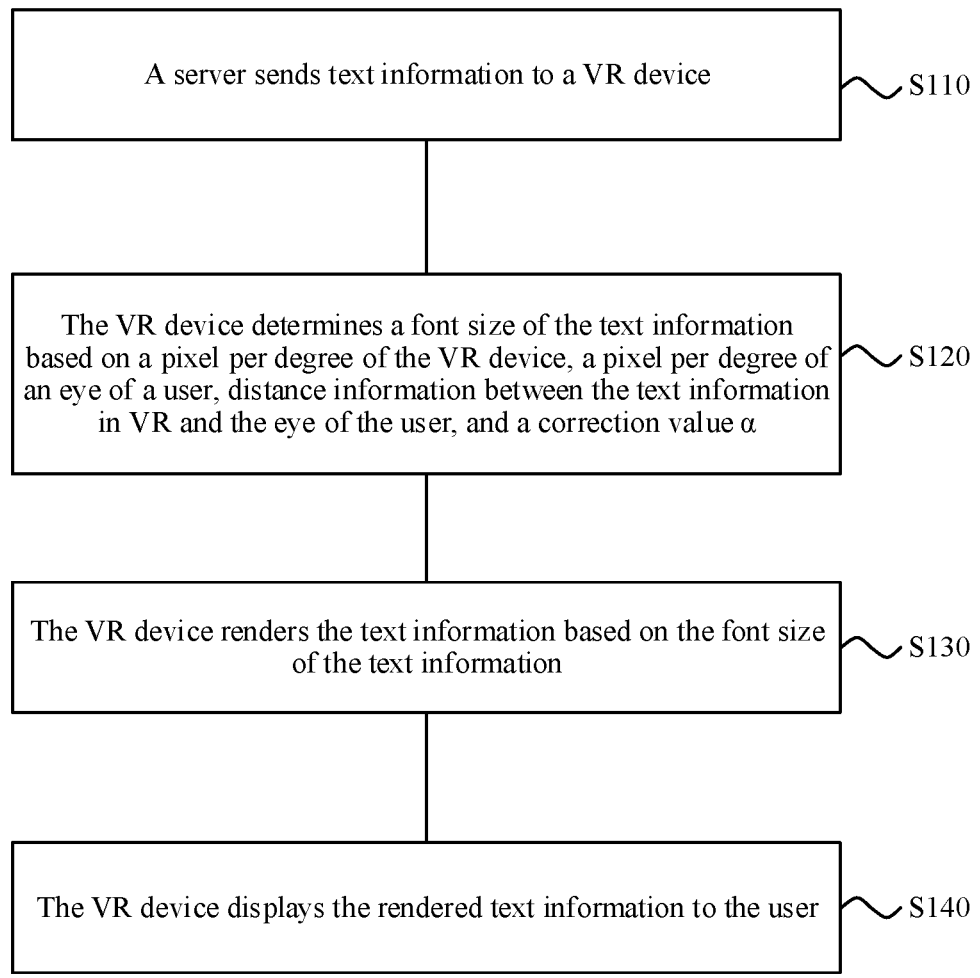
FIG. 4 is a schematic flowchart of a text display method in virtual reality according to an embodiment of this application.

The following describes a text display method in virtual reality provided in an embodiment of this application in detail with reference to FIG. 4. FIG. 4 is a schematic flowchart of a text display method 100 in virtual reality according to an embodiment of this application. The method 100 may be applied to the system architecture shown in FIG. 3, and certainly, may alternatively be applied to other similar system architectures. This is not limited in this embodiment of this application herein.

As shown in FIG. 4, the method 100 includes the following steps:

S110: A server sends text information to a VR device, and correspondingly, the VR device receives the text information.

S120: The VR device determines a font size of the text information based on a pixel per degree of the VR device, a pixel per degree of an eye of a user, distance information between the text information in VR and the eye of the user, and a correction value $\alpha$.

S130: The VR device renders the text information based on the font size of the text information.

S140: The VR device displays the rendered text information to the user.

According to the text display method in virtual reality provided in this embodiment of this application, clear and readable font sizes corresponding to different VR devices and different distances may be determined based on the pixel per degree $PPD_{Human\ eye}$ of the eye of the user, the pixel per degree PPD$_{VR\ device}$ of the VR device, a distance between text information in virtual space and the eye of the user, and the correction value α. For designers and developers of display texts in VR systems, individual differences caused by determining a font effect by using existing visual observation manners can be prevented. Therefore, fonts that are designed and developed by using the method in this embodiment of this application for the display texts in the VR systems are universal, and for most users, the font effect is clear. In addition, for VR devices of different specifications, when same content is migrated between VR devices with different pixels per degree, because the text display method in virtual reality provided in this embodiment of this application is related to the pixel per degree of the VR device, the font size can be adjusted with the different pixels per degree, that is, can adapt to the VR devices of different specifications, to prevent a case in which there are differences between text effects of the text information in a process of migrating the text information between the VR devices of different specifications, thereby improving user experience and reducing difficulty and costs of migrating the text information between the VR devices of different specifications.

It should be understood that, in this embodiment of this application, the VR device may be various types of VR devices, for example, may be a head mounted display or VR glasses. This is not limited in this embodiment of this application herein.

Specifically, in S110, the server sends the text information to the VR device, and a type of the text information may be a text file, or may be other format types used to express the text information. This is not limited in this embodiment of this application herein. The text information may further include other information related to a text, for example, distance information between the text information in the virtual space and the eye of the user. This is not limited by this embodiment of this application herein.

It should be understood that, in embodiments of this application, the server may further send image information or other types of information to the VR device. This is not limited in this embodiment of this application herein.

In S120, a text parameter control module in the VR device determines, based on the received text information, contents and other information of the text information, for example, distance information between the text information in a virtual environment and the eye of the user, and determines the font size of the text information based on the pixel per degree PPD$_{VR\ device}$ of the VR device, the pixel per degree PPD$_{Human\ eye}$ of the eye of the user, the distance information between the text information in the VR and the eye of the user, and the correction value α. For example, a height, a transparency, a color, and the like of a font in the text information may be determined. This is not limited in this embodiment of this application herein.

It should be understood that, in embodiments of this application, the text parameter control module in the VR device may determine a size of an image based on the received other types of information such as an image and the like and distance information between the information such as the image and the like and the eye of the user, and with reference to the pixel per degree PPD$_{VR\ device}$ of the VR device, the pixel per degree PPD$_{Human\ eye}$ of the eye of the user, distance information between the image information in the VR and the eye of the user, and the correction value α. This is not limited in this embodiment of this application herein.

In S130, after determining the font size of the text information, the text parameter control module in the VR device sends a rendering instruction to a 3D rendering module in the VR device, where the rendering instruction includes data such as the determined font size of the text information. The 3D rendering module in the VR device renders each text height in the text information based on the data such as the font size of the text information obtained in the previous step, for example, text height information, to obtain the rendered text information, and sends the rendered text information to a display module in the VR device.

It should be understood that, in embodiments of this application, the 3D rendering module in the VR device may further render a height of information such as the image based on size data of the image information obtained in the previous step, for example, a height, to obtain the rendered image information, and send the rendered image information to the display module in the VR device.

Figure 5:
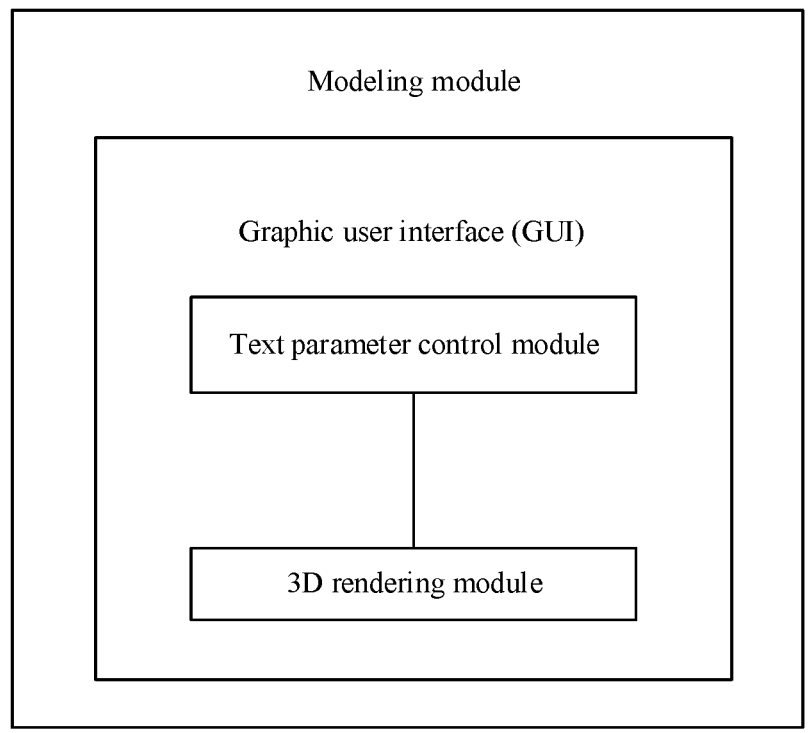
FIG. 5 is a schematic block diagram of a modeling module structure to a VR device.

FIG. 5 is a schematic block diagram of a modeling module structure in the VR device. As shown in FIG. 5, the modeling module in the VR device includes a GUI module, and the GUI module includes the text parameter control module and the rendering module.

It should be understood that, the modeling module may further include other functional modules, for example, an input module and an artificial intelligence module. The GUI module may further include other functional units or modules. This is not limited in this embodiment of this application herein.

In S140, after receiving the rendered data, the display module in the VR device may display the rendered text information or image to the user. A font size of the rendered text information or image adapts to the VR device worn by the user. Therefore, the user can view a text in the text information clearly and has better user experience.

Optionally, in an embodiment, the text information includes the distance information between the text information in the VR and the eye of the user.

Specifically, when the user first wean the VR device or when a user location subsequently changes, because the server can communicate with the VR device, the server may obtain distance information between the text information in a VR environment and the eye of the user, and send the distance information and the text information to the VR device. In this way, a size of the displayed font can be more accurately determined, and a workload of the VR device is reduced, so that display work efficiency of the VR device is improved.

It should be understood that, the text information may include the distance information, and the server may separately send the distance information to the VR device. This is not limited by this embodiment of this application herein.

Figure 6:
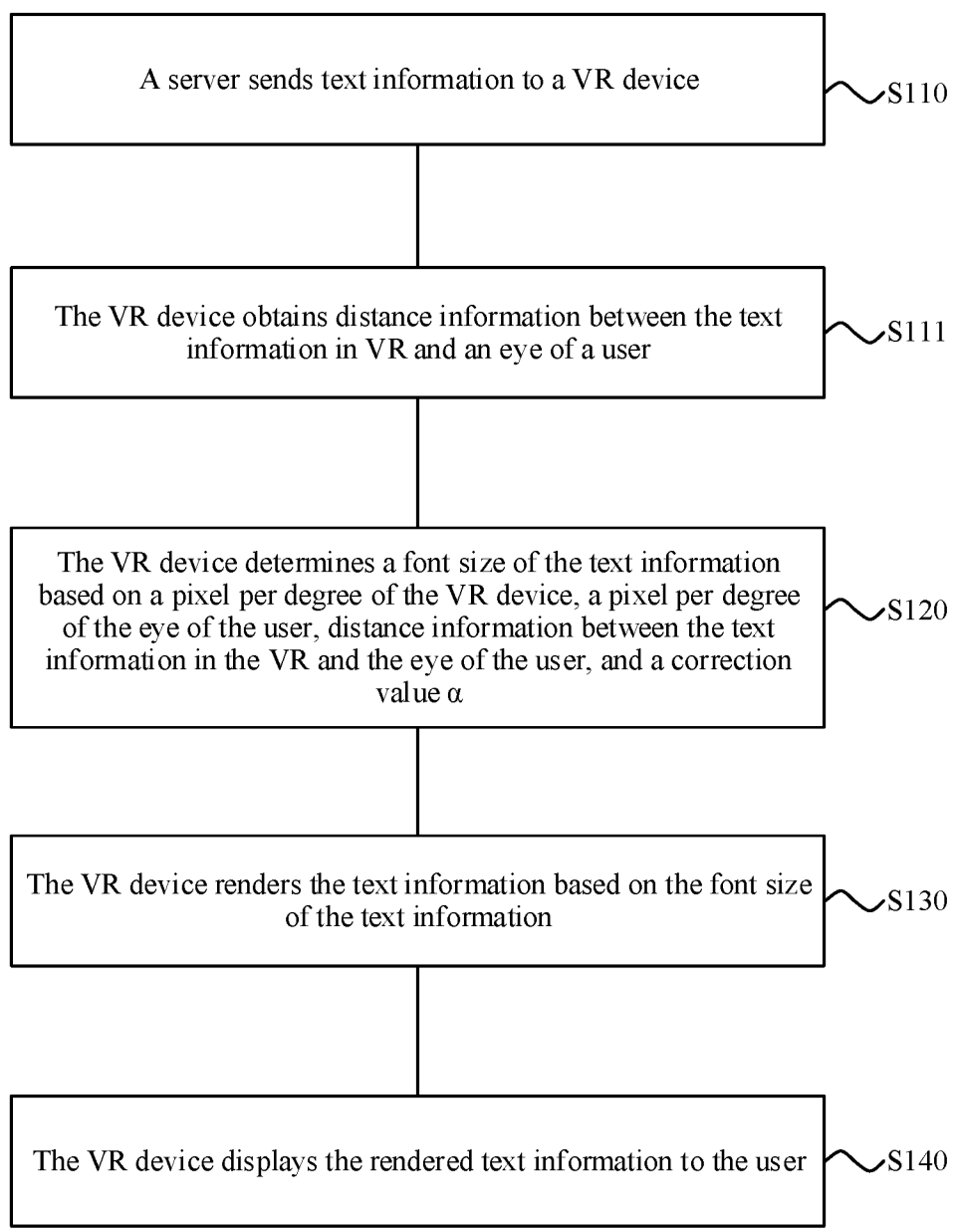
FIG. 6 is a schematic flowchart of a text display method in virtual reality according to another embodiment of this application.

Optionally, in an embodiment, as shown in FIG. 6, before S120, that is, before the determining of a font size of the text information based on a pixel per degree of a virtual reality VR device, a pixel per degree of an eye of a user, distance information between the text information in VR and the eye of the user, and a correction value α, the method 100 further includes the following step:

S111: The VR device obtains the distance information between the text information in the VR and the eye of the user.

Specifically, when the user location changes the distance between the text information in the VR and the eye of the user changes as the user location changes. Therefore, when the user subsequently uses the VR device and the user location changes, the modeling module in the VR device may obtain the distance information between the text information in the VR and the eye of the user for the user in real time, and determine the font size of the displayed text information by using the updated distance information. The font size of the text information in the virtual environment may be controlled in real time based on user location information, and a suitable font size may be determined. In this way, the font size corresponding to the user location can be more accurately determined, that is, the font size can be adjusted in real time, thereby further improving user experience.

It should be understood that, when the user location does not change, the modeling module in the VR device may also obtain the distance information between the text information in the VR and the eye of the user. This is not limited in this embodiment of this application herein.

Optionally, in an embodiment, a relationship between the font size of the text information and the pixel per degree of the VR device, the pixel per degree of the eye of the user, the distance information between the text information in the VR and the eye of the user, and the correction value $\alpha$ may be shown in a formula (1):

$$H_{VR} = \tan\left(\alpha \frac{PPD_{Human\ eye}}{PPD_{VR\ device}}\right) \cdot d \tag{1}$$

In the formula (1), $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, and $\alpha$ is the correction value.

Optionally, in S120, the text parameter control module may determine the font size of the text information based on the formula (1).

Specifically, the modeling module in the VR device may determine, based on the formula (1), the font size $H_{VR}$ displayed in the VR device. In the formula (1), $PPD_{VR\ device}$ is a pixel per degree of a screen of the VR device, pixels per degree of screens of VR devices of different specifications may be different, $PPD_{Human\ eye}$ is the pixel per degree of the eye of the user, d is the distance between the text information in the virtual environment and the eye of the user, and $\alpha$ is the correction value. The modeling module in the VR device may determine, by using the formula (1), the font size of the text information sent by the server, and render the font based on the font size. Finally, the rendered text information is displayed to the user, so that the user can view text content in the VR device clearly.

Optionally, the correction value $\alpha$ is a high corresponding visual angle formed by a text height and the eye of the user, and a value range of $\alpha$ is greater than or equal to 18 degrees and less than or equal to 22 degrees.

Figure 7:
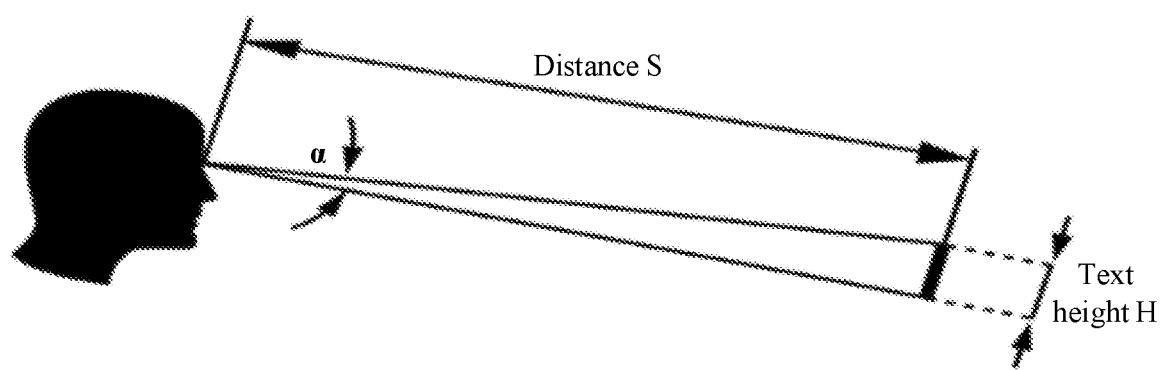
FIG. 7 is a diagram of a relationship between a font height and a distance between a human eye and a text.

Specifically, FIG. 7 is a diagram of a relationship between a font height and a distance between a human eye and a text. As shown in FIG. 7, in a real environment, a relationship between a text height H and a distance S between a human eye and a font is a tangent function, that is, as shown in a formula (2):

$$H = \tan(\alpha) \cdot S \tag{2}$$

That is, a minimum comfortable readable text height H in a real world for a human and the distance S between the human eye and the text meet the formula (2). $\alpha$ is the high corresponding visual angle formed by the text height and the eye of the user, and may also be referred to as an image and text visual angle. Based on an international human-machine design specification, it may be concluded that when the value range of $\alpha$ is greater than or equal to 18 degrees and less than or equal to 22 degrees, a font viewed by a human is clear and meets comfort requirements of human vision.

It should be understood that, the value range of $\alpha$ may be less than 18 degrees or greater than 22 degrees. This is not limited in, this embodiment of this application herein.

Optionally, the pixel per degree $PPD_{Human\ eye}$ of the eye of the user is 60 pixels per degree.

Specifically, for retinal resolution of a human, any screen with more than 60 pixels per degree actually causes a waste, that is, a limit of a pixel per degree of a screen at which human eyes can distinguish details is 60 pixels per degree. Therefore, the pixel per degree $PPD_{Human\ eye}$ of the eye of the user is 60 pixels per degree. When the user can view clearly, a calculation amount of the VR device is reduced and efficiency of the VR device is improved.

It should be understood that, a value of the pixel per degree $PPD_{Human\ eye}$ of the eye of the user may be less than 60 pixels per degree, for example, may be 50 pixels per degree. This is not limited in this embodiment of this application herein.

It should further be understood that, in this embodiment of this application, the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value $\alpha$ may meet other formulas, for example, meet a formula (3):

$$H_{VR} = K\tan\left(\alpha \frac{PPD_{Human\ eye}}{PPD_{VR\ device}}\right) \cdot d \tag{3}$$

In the formula (3), K is equivalent to the correction value. Optionally, in S120, the text parameter control module may determine the font size of the text information based on the formula (3).

It should be understood that, in this embodiment of this application, the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value $\alpha$ may meet other function formulas or formulas of the foregoing formulas after arbitrary deformation. The text parameter control module may determine the font size of the text information based on the other function formulas or the formulas of the foregoing formulas after arbitrary deformation. This is not limited in this embodiment of this application herein.

Figure 8:
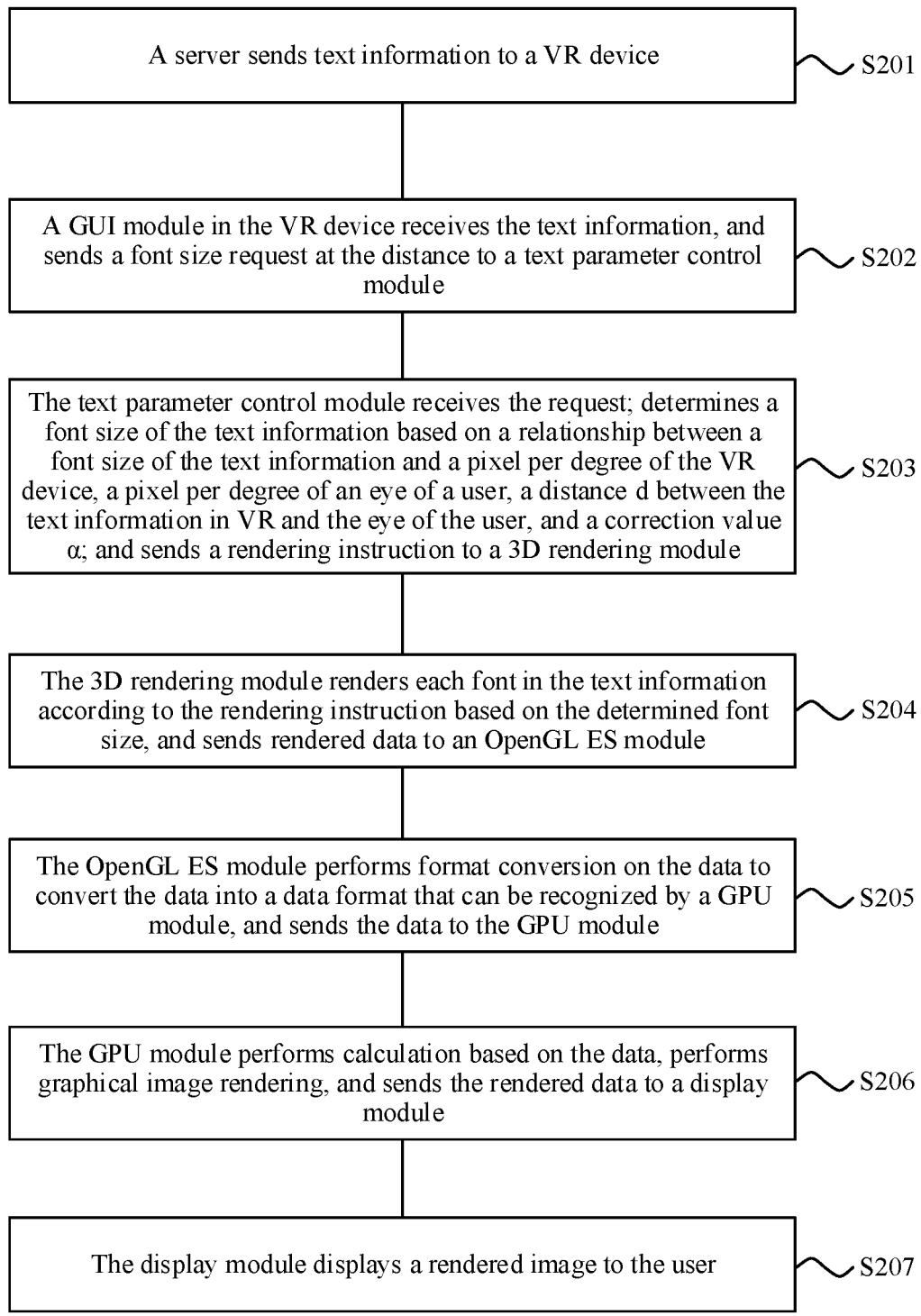
FIG. 8 is a schematic flowchart of a text display method in virtual reality according to another embodiment of this application.

The following describes a text display method 200 in virtual reality provided in an embodiment of this application in detail with reference to FIG. 8. As shown in FIG. 8, the method 200 includes the following steps:

S201: A server sends text information to a VR device.

S202: A GUI module in a modeling module in the VR device receives the text information. Optionally, the GUI module further receives distance information between the text information in a virtual environment and an eye of a user. The GUI module determines a type of the text information and the distance information, and sends a font size request at the distance to a text parameter control module, where the font size request carries the distance information and the text information.

S203: The text parameter control module in the modeling module in the VR device receives the request; determines a font size of the text information based on a relationship between a font size $H_{VR}$ of the text information and a pixel per degree $PPD_{VR\ device}$ of the VR device, a pixel per degree $PPD_{Human\ eye}$ of the eye of the user, and a distance d between the text information in VR and the eye of the user, for example, the foregoing formula (1) or formula (3) or other similar function relationships; and sends a rendering instruction to a 3D rendering module.

S204: The 3D rendering module in the modeling module in the VR device renders each font in the text information according to the rendering instruction with reference to the font size determined by the text parameter control module, and based on the determined font size, and sends rendered data to an OpenGL ES module.

S205: The OpenGL ES module in the VR device performs format conversion on the data to convert the data into a data format that can be recognized by a GPU module, and sends the data to the GPU module.

S206: The GPU module in the VR device performs calculation based on the data, performs graphical image rendering, and sends the rendered data to a display module.

S207: The display module in the VR device displays a rendered image to the user.

According to the text display method in virtual reality provided in this embodiment of this application, clear and readable font sizes corresponding to different VR devices and different distance information are determined based on the pixel per degree $PPD_{Human\ eye}$ of the eye of the user, the pixel per degree $PPD_{VR\ device}$ of the VR device, a distance between the text information in virtual space and the eye of the user, and a correction value α; the text in the text information is rendered based on the font size; and the rendered text information is displayed to the user through the VR device, to prevent a case in which there are differences between text effects of the text information in a process of migrating the text information between VR devices of different specifications, thereby improving user experience and reducing difficulty and costs of migrating the text information between the VR devices of different specifications.

Figure 9:
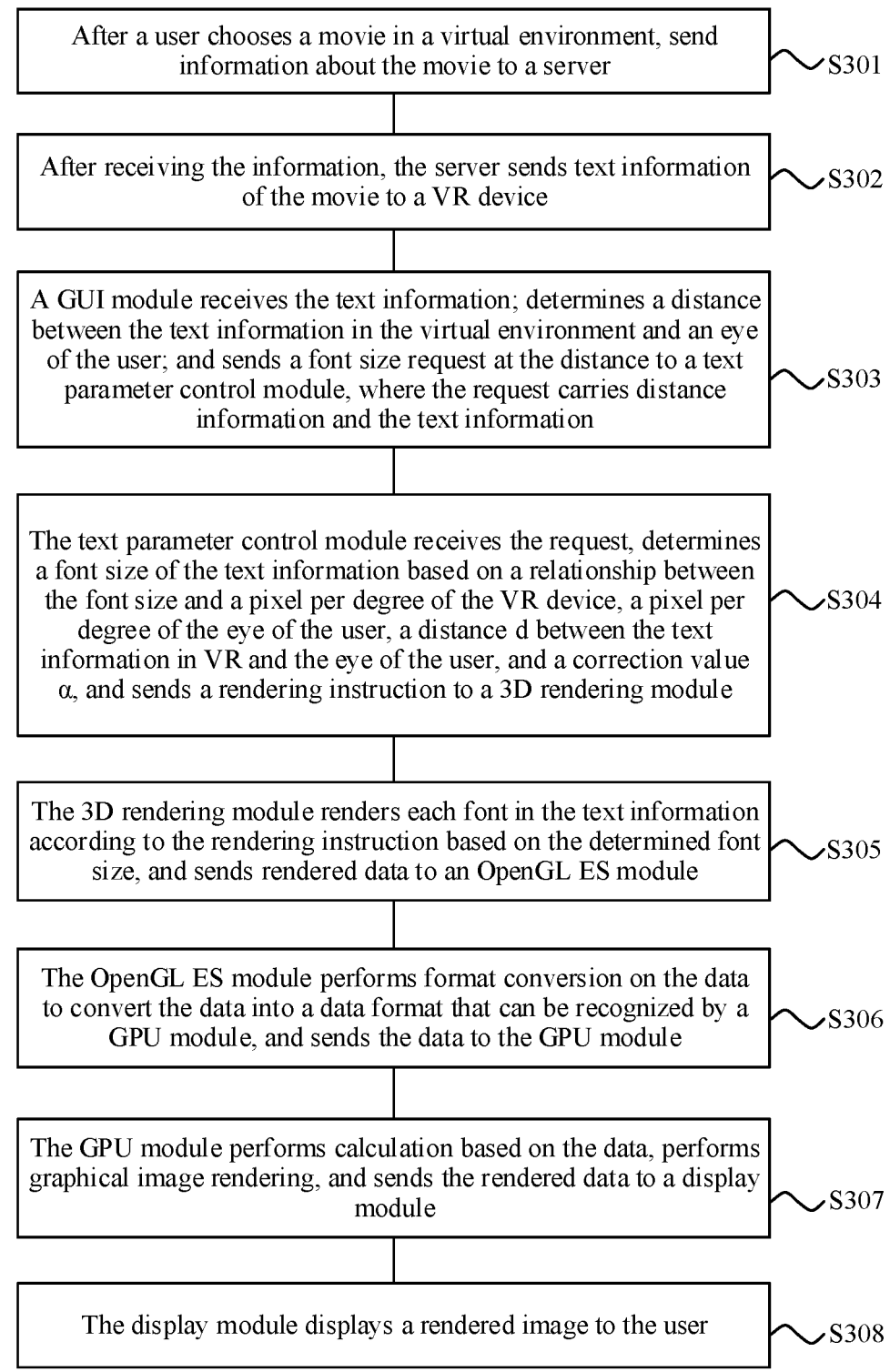
FIG. 9 is a schematic flowchart of a text display method in virtual reality according to still another embodiment of this application.

The following describes a text display method 300 in virtual reality provided, in an embodiment of this application in detail by using an example in which a user wears a VR device to watch a movie in a VR environment. As shown in FIG. 9, the method 300 includes the following steps:

S301: After a user chooses a movie in a virtual environment, for example, the movie *Transformers: Age of Extinction*, send information about the movie to a server.

S302: After receiving the information, a server sends text information of the movie to the VR device, for example, the text information may include: "*Transformers: Age of Extinction*; director: Michael Bay; country or region: America; and synopsis: . . . ".

S303: A GUI module in a modeling module in the VR device receives the text information; determines a type of the text information and a distance between the text information in the virtual environment and an eye of the user, for example, the distance is 10 meters, and sends a font size request at the distance to a text parameter control module in the modeling module, where the request carries distance information and the text information.

S304: The text parameter control module in the modeling module in the VR device receives the request, and calculates a font size of the text information based on a relationship between the font size and a pixel per degree $PPD_{VR\ device}$ of the VR device, a pixel per degree $PPD_{Human\ eye}$ of the eye of the user, a distance d between the text information in VR and the eye of the user, and a correction value α, for example by using the function relationship shown in the foregoing formula (1). For example, based on the foregoing formula (1), a value of a is set to 22 degrees. A value of $PPD_{VR\ device}$ of the VR device is 20 pixels per degree. A value of $PPD_{Human\ eye}$ is 60 pixels per degree and a value of the d is 10 meters, that is, 10000 millimeters. Font height $H_{VR}$ is calculated to be 190 millimeters after the values are substituted into the foregoing formula (1). The text parameter control module sends data of the font height $H_{VR}$ to a 3D rendering module in the modeling module, that is, sends a rendering instruction to the 3D rendering module. Optionally, when a user location changes, the modeling module may further obtain the distance between the text information in the virtual environment and the eye of the user for the user in real time, and determine the font size of the text information by using the updated distance information.

S305: The 3D rendering module in the modeling module renders each font in the text information according to the rendering instruction with reference to the font size determined by the text parameter control module, and based on the determined font size, for example, renders each font in the text information based on a height of 190 millimeters, and sends rendered data to an OpenGL ES module.

S306: The OpenGL ES module in the VR device performs format conversion on the data to convert the data into a data format that can be recognized by a CPU module, and sends the data to the GPU module.

S307: The GPU module in the VR device performs calculation based on the data, performs graphical image rendering, and sends the rendered data to a display module.

S308: The display module in the VR device displays rendered text information or a rendered image to the user, where a font size in the text information and the image corresponds to the VR device and the distance. For example, as shown in FIG. 10, a height of a single word "Play" displayed by the display module is 190 millimeters.

According to the text display method in virtual reality provided in this embodiment of this application, the font size displayed to the user can be adjusted in real time based on a distance between the text information in virtual space and the eye of the user and a pixel per degree of a screen of the VR device used by, the user, so that the user can view the text information in the virtual environment clearly, thereby improving user experience.

It should be understood that, in the embodiments of this application, sequence numbers of the foregoing processes and steps do not imply a sequence of execution. The sequence of execution of the processes should be determined based on functions and inherent logic of the processes, and should not impose any limitations on implementation processes of the embodiments of this application.

Figure 12:
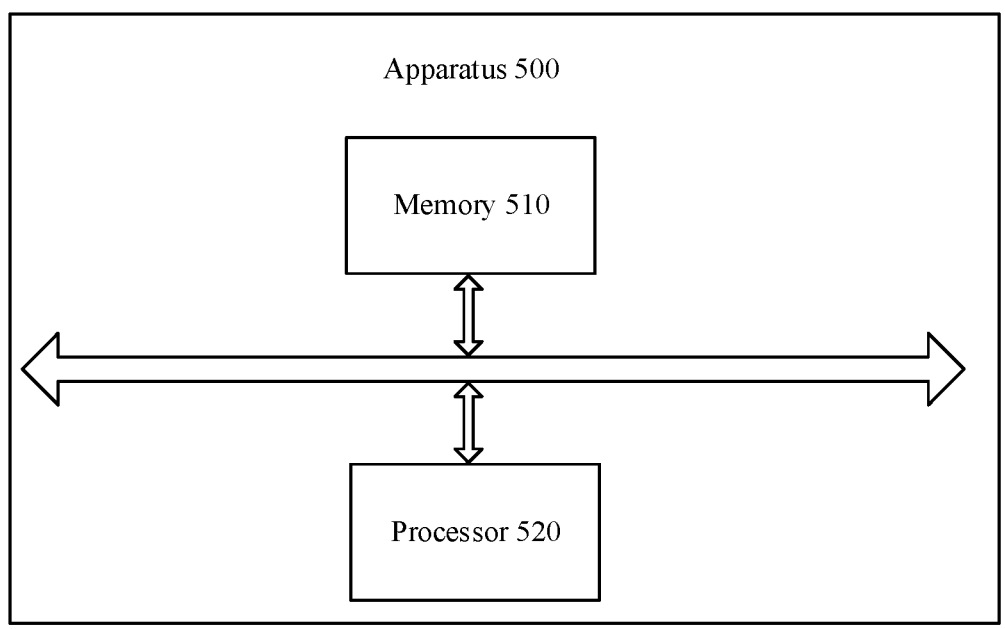
FIG. 12 is a schematic block diagram of a text display apparatus in virtual reality according to another embodiment of this application.

The text display method in virtual reality according to the embodiments of this application is described in detail above with reference to FIG. 1 to FIG. 10, and the following describes a text display apparatus in virtual reality according to embodiments of this application in detail with reference to FIG. 11 and FIG. 12.

FIG. 11 is a schematic block diagram of a text display apparatus 400 in virtual reality according to an embodiment of this application. As shown in FIG. 11, the text display apparatus 400 in virtual reality includes a text parameter control module 410, a 3D rendering module 410, and a display module 430.

The text parameter control module 410 is configured to receive text information.

The text parameter control module 410 is further configured to determine a font size of the text information based on a pixel per degree of a virtual reality VR device, a pixel per degree of an eye of a user, distance information between the text information in VR and the eye of the user, and a correction value α.

The 3D rendering module 420 is configured to render the text information based on the flat size of the text information.

The display module 430 is configured to display the rendered text information.

The text display apparatus provided in this embodiment of this application may determine, based on the pixel per degree $PPD_{Human\ eye}$ of the eye of the user, the pixel per degree $PPD_{VR\ device}$ of the VR device, a distance between text information in virtual space and the eye of the user, and the correction value α, clear and readable font sizes corresponding to different VR devices and different distances. For designers and developers of display texts in VR systems, individual differences caused by determining a font effect by using existing visual measurement manners can be prevented. Therefore, fonts that are designed and developed by using the apparatus in this embodiment of this application for the display texts in the VR systems are universal, and for most users, the font effect is clear. In addition, for VR devices of different specifications, when same content is migrated between VR devices with different pixels per degree, because the text display apparatus in virtual reality provided in this embodiment of this application is related to the pixel per degree of the VR device, the font size can be adjusted with the different pixels per degree, that is, can adapt to the VR devices of different specifications, to prevent a case in which the there are differences between text effects of the text information in a process of migrating the text information between the VR devices of different specifications, thereby improving user experience and reducing difficulty and costs of migrating the text information between the VR devices of different specifications.

It should be understood that, the text parameter control module 410 and the 3D rendering module 420 are disposed in a modeling module, the modeling module is disposed in the VR device, and the display module 430 is also disposed in the VR device.

Optionally, in an embodiment, before determining the font size of the text information, the text parameter control module is further configured to obtain the distance information between the text information in the VR and the eye of the user.

Optionally, in an embodiment, the text information includes the distance information between the text information in the VR and the eye of the user.

Optionally, in an embodiment, a relationship between the font size of the text information and the pixel per degree of the VR device, the pixel per degree of the eye of the user, the distance information between the text information in the VR and the eye of the user, and the correction value α is:

$$H_{VR} = \tan\left(\alpha \frac{PPD_{Human\ eye}}{PPD_{VR\ device}}\right) \cdot d$$

where $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, and α is the correction value.

Optionally, in an embodiment, the text parameter control module is specifically configured to determine the font size of the text information based on the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value α.

Optionally, in an embodiment, the pixel per degree $PPD_{Human\ eye}$ of the eye of the user is 60 pixels per degree.

Optionally, in an embodiment, the correction value α is a high corresponding visual angle formed by a text height and the eye of the user, and a value range of α is greater than or equal to 18 degrees and less than or equal to 22 degrees.

It should be understood that, the foregoing and other operations and/or functions of the modules of the text display apparatus 400 in virtual reality according to this embodiment of this application are respectively for implementing corresponding procedures of the methods in FIG. 4, FIG. 6, FIG. 8, and FIG. 9, and for brevity, details are not described herein again.

FIG. 12 is a schematic block diagram of a text display apparatus 500 in virtual reality according to an embodiment of this application. As shown in FIG. 12, the apparatus 500 includes a memory 510 and a processor 520. The memory 510 and the processor 520 communicate with each other through an internal connection path, to transfer a control and/or data signal.

The memory 510 is configured to store program codes.

The processor 520 is configured to invoke the program code to implement the methods in the embodiments of this application.

The text display apparatus 500 in virtual reality shown in FIG. 12 may implement the processes implemented in the embodiments in FIG. 4, FIG. 6, FIG. 8, and FIG. 9, and for brevity, details are not described herein again.

It should be understood that, the processor 520 in this embodiment of this application may be a central processing unit (CPU), or the processor 520 may be another general-purpose processor, a digital signal processor (DSP), an application-specific integrated circuit (ASIC), a field programmable gate array (FPGA), or another programmable logical device, discrete gate or transistor logical device, discrete hardware component, or the like. The general-purpose processor may be a microprocessor or the processor may be any conventional processor and the like.

The memory 510 may include a read-only memory and a random access memory, and provide an instruction and data to the processor 520. A part of the memory 510 may further include a non-volatile random access memory. For example, the memory 510 may further store information of a device type. It may be clearly understood by a person skilled in the art that, for the purpose of convenient and brief description, for a detailed working process of the foregoing system, apparatus, and unit, refer to a corresponding process in the foregoing method embodiments, and details are not described herein again.

In an implementation process, steps in the foregoing methods can be implemented by using a hardware integrated logical circuit in the processor 520, or by using an instruction in a form of software. The steps of the text display method in virtual reality disclosed with reference to the embodiments of this application may be directly performed and completed by a hardware processor, or may be performed and completed by using a combination of hardware and software modules in the processor 520. The software module may be located in a storage medium. The storage medium is located in the memory 510, and the processor 520 reads information in the memory 510 and completes the steps in the foregoing methods in combination with hardware of the processor. To avoid repetition, details are not described herein again.

It may be understood that the memory in the embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. It should be noted that the memory of the systems and methods described in this specification includes but is not limited to these and any memory of another proper type.

An embodiment of this application further provides a virtual reality VR device, including any one of the text display apparatuses in virtual reality provided in the foregoing embodiments of this application.

The virtual reality VR device provided in this embodiment of this application may implement the text display methods in virtual reality in the embodiments of this application in FIG. 4, FIG. 6, FIG. 8, and FIG. 9. That is, the clear and readable font sizes corresponding to the different VR devices and the different distances are determined based on the pixel per degree $PPD_{Human\ eye}$ of the eye of the user, the pixel per degree $PPD_{VR\ device}$ of the VR device, the distance between the text information in the virtual space and the eye of the user, and the correction value $\alpha$. For most users, when the VR device with the font is used, an effect of a viewed font or image is clear, thereby improving user VR experience.

It should be understood that, the VR device provided in this embodiment of this application may be various types of VR devices for example, may be a head mounted, display or VR glasses. This is not limited in this embodiment of this application herein.

An embodiment of this application further provides a computer-readable medium, configured to store computer program code. The computer program includes an instruction used to implement the text display methods in virtual reality in the embodiments of this application in FIG. 4, FIG. 6, FIG. 8, and FIG. 9. The readable medium ma be a ROM or a RAM, and is not limited in this embodiment of this application herein.

An embodiment of this application further provides a system chip. The system chip includes a processing unit and a communications unit. The processing unit may be, for example, a processor, and the communications unit may be an input/output interface, a pin, a circuit, or the like. The processing unit may execute a computer instruction, so that a chip in the terminal performs any one of the text display methods in virtual reality.

Optionally, the computer instruction is stored in a storage unit.

Optionally, the storage unit is a storage unit in the chip, for example, a register or a cache. The storage unit may alternatively be a storage unit located outside the chip in the terminal, for example, a ROM or other types of static storage devices that can store static information and a static instruction, or a RAM. Any one of the processors mentioned above may be a CPU, a microprocessor, an ASIC, or one or more integrated circuits configured to control program execution of the text display method in virtual reality.

It should be understood drat the term "and/or" and "at least one of A or B" in this specification describes only an association relationship for describing associated objects and represents that three relationships may exist. For example, A and/or B may represent the flowing three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the related art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing, storage medium includes: any medium that can store program code, such as a USB flash drive, a removable hard disk, a ROM, a RAM, a magnetic, disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A text display method in virtual reality, comprising:
receiving text information;
determining a font size of the text information based on a pixel per degree of a virtual reality (VR) device, a pixel per degree of an eye of a user, distance information between the text information in VR and the eye of the user, and a correction value α;
rendering the text information based on the font size of the text information; and
displaying the rendered text information,
wherein a relationship between the font size of the text information and the pixel per degree of the VR device, the pixel per degree of the eye of the user, the distance information between the text information in the VR and the eye of the user, and the correction value α is:

$$H_{VR} = \tan\left(\alpha \frac{PPD_{Human\ eye}}{PPD_{VR\ device}}\right) \cdot d \text{ or } H_{VR} = K\tan\left(\alpha \frac{PPD_{Human\ eye}}{PPD_{VR\ device}}\right) \cdot d,$$

wherein $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, α is the correction value, and K is equivalent to the correction value.

2. The method according to claim 1, wherein before the determining of the font size of the text information, the method further comprises:
obtaining the distance information between the text information in the VR and the eye of the user.

3. The method according to claim 1, wherein the text information comprises the distance information between the text information in the VR and the eye of the user.

4. The method according to claim 1, wherein the determining of the font size of the text information comprises:
determining the font size of the text information based on the relationship between the font size $H_{VR}$ of the text information and the pixel per degree $PPD_{VR\ device}$ of the VR device, the pixel per degree $PPD_{Human\ eye}$ of the eye of the user, the distance d between the text information in the VR and the eye of the user, and the correction value α.

5. The method according to claim 1, wherein the pixel per degree $PPD_{Human\ eye}$ of the eye of the user is 60 pixels per degree.

6. The method according to claim 1, wherein the correction value α is a high corresponding visual angle formed by a text height and the eye of the user, and a value range of α is greater than or equal to 18 degrees and less than or equal to 22 degrees.

7. A text display apparatus in virtual reality, comprising:
at least one processor; and
a non-transitory computer-readable storage medium coupled to the at least one processor and storing programming instructions for execution by the at least one processor, the programming instructions instruct the at least one processor to perform the following operations:
receiving text information, and obtain a font size of the text information based on a pixel per degree of a virtual reality (VR) device, a pixel per degree of an eye of a user, distance information between the text information in VR and the eye of the user, and a correction value α;
rendering the text information based on the font size of the text information; and
displaying the rendered text information,
wherein a relationship between the font size of the text information and the pixel per degree of the VR device, the pixel per degree of the eye of the user, the distance information between the text information in the VR and the eye of the user, and the correction value α is:

$$H_{VR} = \tan\left(\alpha \frac{PPD_{Human\ eye}}{PPD_{VR\ device}}\right) \cdot d \text{ or } H_{VR} = K\tan\left(\alpha \frac{PPD_{Human\ eye}}{PPD_{VR\ device}}\right) \cdot d,$$

wherein $H_{VR}$ is the font size of the text information, $PPD_{Human\ eye}$ is the pixel per degree of the eye of the user, $PPD_{VR\ device}$ is the pixel per degree of the VR device, d is a distance between the text information in the VR and the eye of the user, α is the correction value, and K is equivalent to the correction value.

8. The apparatus according to claim 7, wherein the programming instructions further instruct the at least one processor to perform the following operation of:
obtaining the distance information between the text information in the VR and the eye of the user.

9. The apparatus according to claim 7, wherein the text information comprises the distance information between the text information in the VR and the eye of the user.

10. The apparatus according to claim 7, wherein the programming instructions further instruct the at least one processor to perform the following operation of: obtaining the font size of the text information based on the relationship between the font size $H_{VR}$ of the text information and the pixel per degree $PPD_{VR\ device}$ of the VR device, the pixel per degree $PPD_{Human\ eye}$ of the eye of the user, the distanced between the text information in the VR and the eye of the user, and the correction value α.

11. The apparatus according to claim 7, wherein the pixel per degree $PPD_{Human\ eye}$ of the eye of the user is 60 pixels per degree.

12. The apparatus according to claim 7, wherein the correction value α is a high corresponding visual angle formed by a text height and the eye of the user, and a value range of α is greater than or equal to 18 degrees and less than or equal to 22 degrees.

* * * * *